Aug. 17, 1926.

E. A. FARRON

FASTENING DEVICE

Filed Feb. 15, 1926

1,596,342

INVENTOR
E. A. Farron
BY
ATTORNEYS

Patented Aug. 17, 1926.

1,596,342

UNITED STATES PATENT OFFICE.

ELIE A. FARRON, OF CHICAGO, ILLINOIS.

FASTENING DEVICE.

Application filed February 15, 1926. Serial No. 88,361.

My invention relates to improvements in fastening devices, such as those used in fastening gloves, curtains, and other articles where two pieces of material are to be brought together, and it consists in the combinations, constructions and arrangements herein described and claimed.

An object of my invention is to provide a device to take the place of the ordinary snap fastener, which may be readily manipulated to secure together adjacent edges of material, and which will remain positively locked in position, thus obviating the inconvenience caused by the loosening of the ordinary snap fastener.

A further object of the invention is to provide a device of the type described, which is easy to unfasten, due to the use of cam surfaces which tend to disengage the parts when they are moved into certain relative positions.

A further object of my invention is to provide a positive fastening means for gloves, curtains, and the like, which can be made at a relatively small cost, has few parts, and is not liable to easily get out of order.

Other objects and advantages will appear in the following specification, and the novel features of the invention will be particularly pointed out in the appended claims.

My invention is illustrated in the accompanying drawings, forming part of this application, in which—

Figure 4:
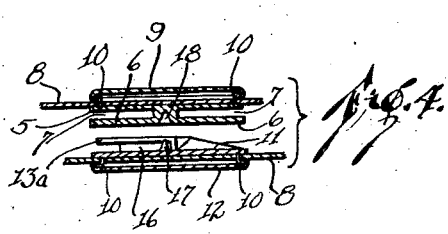
Figure 4 is a section substantially along the line 4—4 of Figure 3, showing the parts detached, but in their relative positions for attachment.
Figure 2:
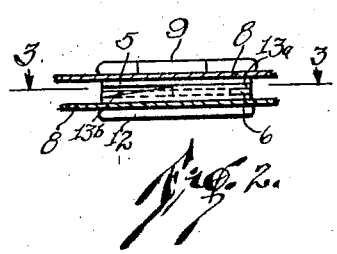
Figure 2 is an enlarged section through the fastening device in its closed position.

In carrying out my invention, I provide a pair of fastening members, one of said members having a body portion 5 and having secured thereto a tongue 6 which, as will be observed, is spaced from the body portion to provide slots 7. The body portion 5 has curved teeth 10 which are arranged to pass through fabric 8, or other material which it is designed to fasten, and to engage the inturned edges of the member 9, see Figure 4. The member 9, in the present instance, is made in octagonal shape, so as to form a button-like portion.

Figure 3:
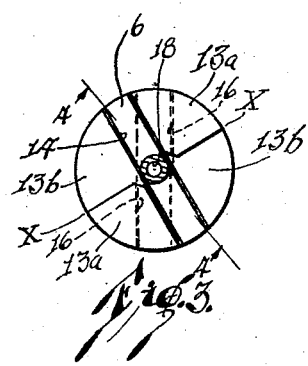
Figure 3 is a section along the line 3—3 of Figure 2.

The companion fastening member consists of a body portion 11 which is provided with teeth 10 arranged to pass through the fabric 8 and to engage the inwardly turned rim of a member 12. The body portion 11 is provided with a groove 14. On each side of the groove is a raised portion 13$^a$, the outer surface of which is parallel with the body portion, and which slopes from a point X to the surface of the body portion 11, so as to form cam surfaces 13$^b$. It will be observed from Figure 3 that the cam surfaces 13$^b$ are diagonally opposite with respect to the groove which separates them. The raised portions 13$^a$ have slots 16 which are arranged to receive the tongue 6, as will be hereinafter described. In the present instance, a centering pin 17 is carried by the body portion 11, while a recess 18 is disposed in the accompanying fastening member and is arranged to receive the centering pin 17.

Figure 1:
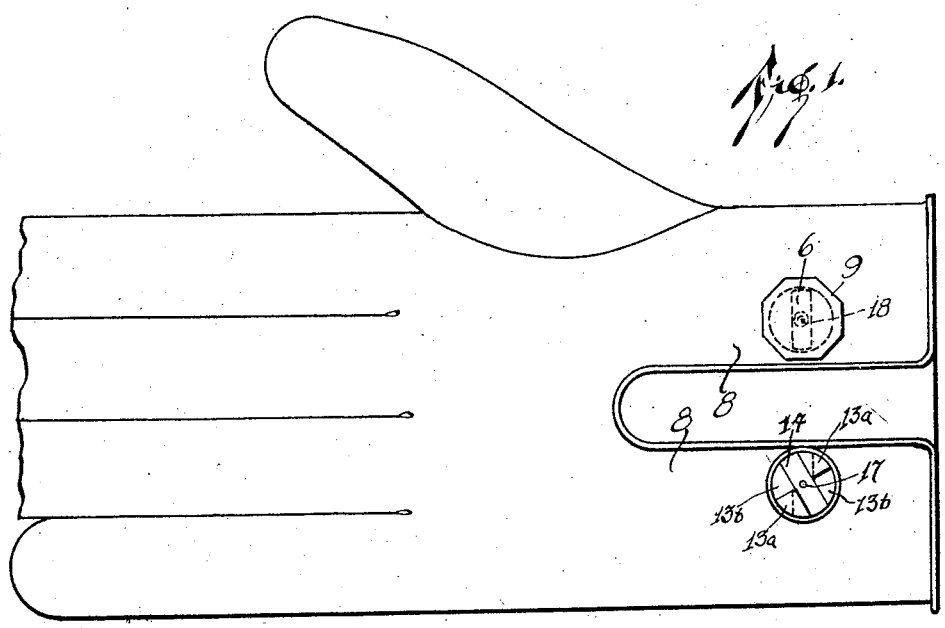
Figure 1 is a plan view of a glove provided with my improved fastening device.

From the foregoing description of the various parts of the device, the operation thereof may be readily understood. In Figure 1, I have shown the fastening members as secured to the parts which they are intended to fasten. It will be observed, however, that the tongue 6 is not in alinement with the groove or slot 14, but that the latter is angularly inclined with respect to the tongue. When it is desired to fasten the glove, the member 9 is grasped and twisted, together with the fabric, so as to bring it into registration with the groove 14. The parts are then pressed together, the centering pin entering the recess 18, after which a slight twist will bring the tongue 6 into the recess 16 in the raised portions 13$^a$. This will lock the parts together and fasten the adjacent edges of the gloves.

When it is desired to unfasten the glove, the part 9 is again grasped and twisted or rotated in the opposite direction. Of course, when the tongue reaches the groove, the parts are in a position to be separated, but I have found in practice that if an attempt is made to separate the parts, there is a tendency for the twisted glove to rotate the tongue back again, so that the edge of the tongue catches in the groove. Therefore, I have provided the cam surfaces 13ᵇ. It will be observed that if, instead of stopping when the tongue and groove come into registration, the rotary movement is continued, the opposite edges of the tongue will now ride upon the cam surfaces, and being out of the slot 16, the parts will tend to separate. Then as soon as the centering pin leaves the recess 18, the parts may be loosened, and the portions will separate, because the parts have been so far apart that there is no chance again of the tongue entering the groove.

This means of insuring the release of the parts forms one of the main features of my invention.

I am aware that tongues and grooves for fastening gloves and the like are not broadly new, but in certain devices of the type, springs are used. This renders the structure complex. In my device no springs are necessary, for when the parts are rotated far enough, they are actually pushed apart, as far as any fastening engagement is concerned. It is obvious that the centering pin or the centering recess may be on either part, without departing from the spirit and scope of the invention.

I claim:

1. A fastening device comprising a pair of fastening members, one of said members having a tongue, and the other member having slots arranged to receive the tongue when the members are rotated relatively to one another in one direction, and cam surfaces carried by the second named member and arranged to engage the tongue for forcing the members apart when they are rotated in the reverse direction.

2. A fastening device comprising a pair of fastening members, one of said members having a tongue, and the other member having slots arranged to receive the tongue when the members are rotated relatively to one another in one direction, interengaging centering means carried by said members, and cam surfaces carried by the second named member and arranged to engage the tongue for forcing the members apart when they are rotated in the reverse direction.

ELIE A. FARRON.